Figure 1:
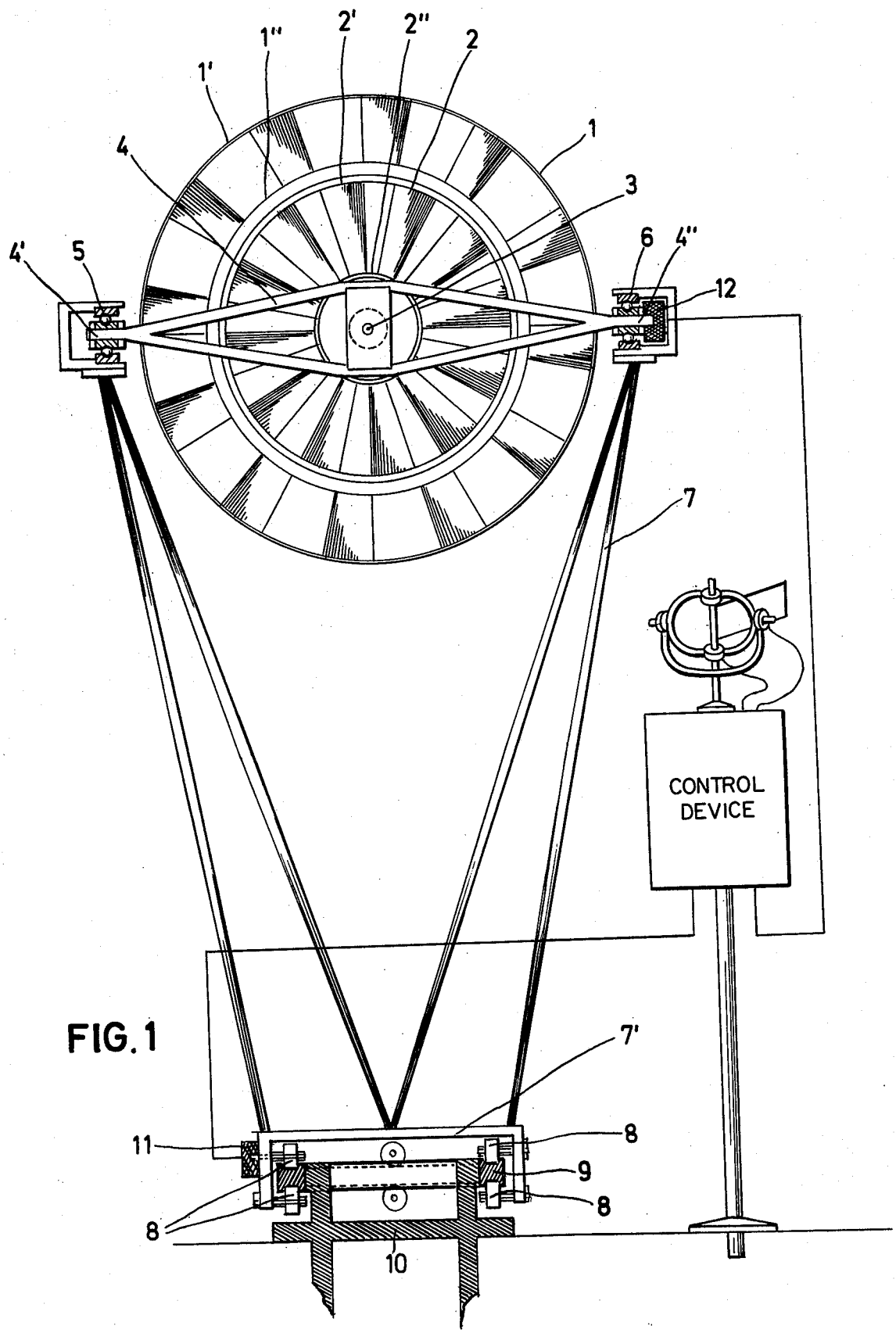

United States Patent [19]

Kling

[11] 4,088,352

[45] May 9, 1978

[54] WIND-DRIVEN POWER PLANT

[76] Inventor: Alberto Kling, Am Hugel 14, 8136 Percha, Germany

[21] Appl. No.: 561,709

[22] Filed: Mar. 25, 1975

[30] Foreign Application Priority Data

Feb. 14, 1975 Germany .............................. 2506160

[51] Int. Cl.² ............................................. F03D 7/02
[52] U.S. Cl. .................................................. 290/55
[58] Field of Search .................................... 290/44, 55

[56] References Cited

U.S. PATENT DOCUMENTS

| 2,052,816 | 9/1936 | Dunn | 290/55 |
| 2,153,523 | 4/1939 | Roberts et al. | 290/55 |
| 2,484,291 | 10/1949 | Hays | 290/55 X |

FOREIGN PATENT DOCUMENTS 556,032  8/1932  Germany.

Primary Examiner—Robert K. Schaefer
Assistant Examiner—W. E. Duncanson, Jr.
Attorney, Agent, or Firm—Stevens, Davis, Miller & Mosher

[57] ABSTRACT

A wind-driven power plant comprising at least one rotor having a gyration axis, a base, a carrier construction pivotable on said base about an upstanding axis, a support structure pivotable on said carrier construction about a tilt axis in a manner permitting precession of said rotor, said rotor being rotatably supported by said support structure and rotatable about said gyration axis, an adjusting device for pivoting said carrier construction on said base in response to changes in horizontal wind direction, a setting device for exerting torque directly or indirectly on the rotor gyration axis or on the rotor which has a torque vector component extending perpendicularly to the rotor gyration axis and perpendicularly to the upstanding axis, said tilt axis intersecting both the rotor gyration axis and the upstanding axis and forming an angle with both, and a control device for controlling the magnitude of movement of said adjusting and setting devices in response to the rotor rotational speed and the desired wind direction orientation to be exerted on the rotor in accordance with the torque to be exerted by the upstanding axis adjusting device and in compliance with the laws of gyroscopic precession.

22 Claims, 8 Drawing Figures

WIND-DRIVEN POWER PLANT

This invention relates to a wind-driven power plant comprising at least one rotor which is mounted in a support structure to be rotatable about a rotor gyration axis and to be pivotable about an upstanding axis forming an angle with said rotor gyration axis by means of an adjustment device for wind orientation, and which drives a machine, e.g. an electric generator.

There are already known wind-driven power plants of the afore-explained type in which a propeller is mounted on the front end of a substantially horizontal support for rotation about a horizontal axis, the support itself being mounted for rotation about, for example, a vertical axis, and a wind vane or fin being positioned at the rear end of said support for automatically orienting the propeller in the wind direction by pivoting the support about said vertical axis. In this case, the vertical wind direction component is not taken into account. Such known wind power plants have been limited to relatively small propeller diameters in the magnitude of one meter to a maximum of a few meters in diameter. The forces produced at the bearings of the propeller or rotor gyration axis due to the gyroscopic effect of the propeller when its direction is changed, however, can still be controlled within these dimensions. The output capacity of such wind power engines, however, is very limited due to the limitation in their dimensions. Attempts have already been made to construct larger wind-driven power plants of the above-mentioned kind (proposals were made in this context, for example, by Honnef in his publication "Windkraftwerke" (Wind-driven Power Stations), Berlin, 1932, published in ELGAWE-Tagesfragen, Verlag Dr. Fritz Pfotenhauer, as well as in German Pat. No. 556,032).

An American experimental plant having a rotor of approx. 70 meters in diameter was destoryed by the rotor being torn off its support structure and blown away when the rotor orientation was changed, in spite of having a very low rotational speed. The deformations and forces arising in such large-scale installations, which alone would be economical in many cases to exploit the wind conditions to supply useful energy, are thus far not controllable so that up to this day wind power utilization is achieved on a very limited scale in small wind-driven power plants. In view of the increasing shortage and rising costs of other energy sources, however, the economical utilization of available wind power is of ever increasing importance.

It is the object of this invention to provide a wind-driven power plant of the type mentioned at the outset which is apt for being designed as a large-scale installation having simple, lightweight and economical construction, which may be oriented into the direction of the wind rapidly, accurately and without producing any forces which are difficult to control or which cannot be controlled at all, and which is reliable, safe and economical in operation while permitting one to achieve an optimum degree of utilization of wind power.

This object is accomplished in accordance with the invention in that the rotor gyration axis is mounted in the support structure so as to be pivotable about another imaginary tilt axis in a manner permitting precession of the rotor(s), said tilt axis intersecting both the rotor gyration axis and the upstanding axis and forming an angle with both, and that a positioning means for positioning the main rotor plane comprises in addition to the adjusting device for turning the rotor(s) about the upstanding axis in the event that an adjustment of the rotor(s) should be made in response to changes in the horizontal wind direction, at least one setting device which directly or indirectly exerts a torque on the rotor gyration axis or on the rotor(s) which has a torque vector component extending perpendicularly to the rotor gyration axis and perpendicularly to the upstanding axis, the respective magnitude of which may be controlled by means of a control device in response to the rotor rotational speed and the desired wind direction orientation movement to be exerted on the rotor(s) in accordance with the torque to be exerted by the upstanding axis adjustment device, and in compliance with the laws of gyroscopic precession.

The wind-driven power plant according to the invention has substantial advantages as compared to the prior art. In the known wind-driven power plants, the product of the torque required to turn the rotor together with its support about the upstanding axis and the angular displacement corresponds to the work put into the system which results in a deceleration of the rotational speed of the rotor(s). The expenditure of this energy must be considered as a double loss, since the energy which must be expended to turn the system about the upstanding axis appears as a corresponding loss of rotational energy of the rotor(s). By contrast, the invention is based on the concept of regarding the rotor(s) of a wind-driven power plant as a gyroscope and to utilize the precession which occurs when external torques are exerted on a rotating gyroscope to position the rotor(s), i.e. for adjusting them to the direction of the wind.

In the wind-driven power plant according to the invention, each rotor is rotatably mounted about three axes which form angles with one another, i.e. the rotor gyration axis, the upstanding axis and an additional tilt axis. Presuming for purposes of illustration that the upstanding axis is vertical, the rotor gyration axis is substantially horizontal and points in the wind direction and the tilt axis is substantially horizontal and extends transversely to the wind direction, and provided that the rotor(s) gyrate(s) thus forming a gyroscope, and that the support structure carrying the rotor(s) is turned about the upstanding axis by means of an adjustment device, e.g. a rotary drive means or control flaps, then, due to the precession occuring on the rotor(s), the rotor gyration axis therewith will be tilted upwardly or downwardly about the tilt axis according to the sense of turning of the support structure about the upstanding axis. The arrangement of the tilt axis thus prevents the support structure from having to absorb bearing forces which work against the precessional forces. In the case of rotors rotating at high speeds or of rotors having large dimensions (in the order of 70 meters), even if such rotors rotate slowly, such bearing forces will be so great that uneconomically large support structures would have to be built in order to absorb these forces. Moreover, during a turning about the upstanding axis without the provision of a tilt axis one would have to put up with the afore-discussed energy loss of known wind power plants. By constrast, the carrier structure in the inventive wind-driven power plant may be a very light weight construction because it only has to bear the weight of the rotor(s), but not additional bearing forces which arise from precession. A wind-driven power plant according to the invention in which the rotor gyration axis is tilted upwardly or downwardly in response to rotation of the system about the upstanding axis, may be employed without the presence of additional setting devices in all cases in which the horizontal wind direction remains substantially constant, but the rotor position is to be adapted to a change in the vertical wind component, e.g. updraft or downdraft. This applies, for example, to the arrangement of a wind rotor transversely to a deep valley or canyon where the wind always blows in the direction of the valley or canyon, but has variations in its upward or downward component. If in a wind-driven power plant according to the invention the rotor orientation is to be adapted not only to a variation in the vertical wind direction component, but also in the horizontal wind direction, the invention provides for an additional setting device which permits a torque to be exerted on the tilt axis of the rotor mounting. When the rotor(s) rotate in such an inventive wind-driven power plant, the exertion of a torque on the tilt axis causes a precession of the gyroscopic system formed by the rotor(s) about the upstanding axis, i.e. an adjustment movement of the rotors with respect to the horizontal wind direction. If adaptation is required both to the horizontal and to the vertical wind direction, precession originating torques can be exerted on the upstanding axis of the system by means of the adjusting device and on the tilt axis of the system by means of the setting device. Electric motors acting on the upstanding axis and the tilt axis could be used as the adjusting and setting devices. The adjustment device and the setting device may be connected to and controlled by a control device which may be fed with measured variables such as the rotary speed of the rotor(s) and the desired angular changes of the rotor gyration axis in the horizontal and vertical direction. The desired angular changes may be measured, for example, by means of a gimbal-mounted wind vane, i.e. by means of a wind vane which detects wind direction changes both in the horizontal as well as in the vertical direction, and converted into electrical signals and supplied to said control device. The rotational speed can be measured by means of a conventional tachometer (revolution counter) and may also be fed as an electrical signal to the control device. The control device, which may be designed as an electronic device, transforms the supplied signals into instructions for the adjustment device or the setting means in accordance with the laws of gyroscopic motion. In this manner, it is possible to provide a continuous and highly sensitive direction control of the rotor(s) of the inventive wind-driven power plant in dependence of the wind direction.

A wind-driven power plant according to the invention may be designed such that all devices for producing torques on axes (upstanding axis, tilt axis, rotor gyration axis) of the system, e.g. the adjusting device, one or more setting devices may be de-activated during very violent storms, in particular during typhoons, i.e. that all constraints on the three afore-cited axes are interrupted. In such a case, through the action of the force of the wind, the rotor(s) will automatically adjust by precession to a neutral position of minimum wind resistance, thereby achieving automatic overload safeguards for the wind-driven power plant.

In the wind-driven power plant according to the invention, a double function may be fulfilled both by the adjustment device for turning about the upstanding axis as well as the setting devices, if any, for rotation about the tilt axis, in particular if mechanical or electromechanical devices are concerned. These devices allow the rotating rotor system by utilizing the precession, to be aligned in and maintained in a given wind direction. If the rotor system is not spinning, the devices may serve to turn the rotor(s) into a desired position.

All embodiments of the wind-driven power plant according to the invention have a great common advantage in that they have a very low constructional cost, are light in weight and thus may be manufactured with relatively low material and cost expenditure, are continually and exactly adaptable to the prevailing wind direction and thus permit a particularly economical utilization of the wind energy. Due to the elimination of precessional forces acting on the support framework in the invention wind-driven power plant, large-scale plants may be constructed which render possible an economical utilization even of winds with a very low flow velocity.

Advantageously, the wind-driven power plant in accordance with the invention is designed such that all parts of the wind-driven power plant and the mounting of the rotor(s) are so constructed that mass equilibrium is respectively provided for the rotary motions about each of the three axes, the rotor gyration axis, the tilt axis and the upstanding axis. In this manner it is ensured that torques are not introduced through the influence of gravity, e.g. by an unequal distribution of the weights of the support structure about the tilt axis, which as soon as the rotor(s) spin(s) would originate a precession of the rotor system. If there is no such equilibrium of weight or mass, the effect of gravity must be compensated for by the adjustment or setting devices which act about the respective axis in order to avoid undesired precession. Under certain circumstances, however, such a construction may be advantageous if automatic precession and thus automatic orientation of the rotor(s) in a specific position is to be accomplished by the presence of intentional imbalance relative to the distribution of weight when the adjusting and/or setting devices are not in operation.

A favourable embodiment of the wind-driven power plant according to the invention, provides that two coaxial, coplanar counterrotating rotors are mounted so as to be rotatable about the gyration axis. If two counterrotating coaxial and coplanar rotors are used in a wind-driven power plant according to the invention, the wind blowing towards the rotors impinges upon these at the same velocity. Therefrom results that the air impulse which impinges on each rotor is proportional to the respective rotor area. Thus the energy transmitted by the wind to each rotor, is also proportional to the respective rotor area. In the case of coaxial and coplanar rotors, the inner rotor normally has a smaller area than the outer rotor when the rotor blade length is properly dimensioned in accordance with aerodynamic principles. The rotational speed of the outer rotor will then normally be greater than that of the inner rotor, particularly if the two counterrotating rotors form the two parts of an electric generator ("stator" and "rotor") as will be explained hereinafter, because then the torque of the outer rotor must be equal and opposite to the torque of the inner rotor and the output of each rotor is proportional to the product of the rotational speed and the torque. Theoretically it would be possible to mutually compensate the angular momentums of the two coaxial counterrotating rotors in such an embodiment of the inventive wind-driven power plant. This would have the effect that in this case the gyroscopic affects of the counterrotating rotors would mutually compensate each other and a torque application on the rotor gyration axis would not produce any precession irrespective of whether it were exerted about the upstanding axis, the tilt axis or the rotor gyration axis. In practise, such a compensation of angular momentum of the rotors is a difficult task considering the afore-mentioned relationships in coaxial counterrotating rotors, since either an unproportional high weight must be given to the smaller inner rotor in order to correspondingly increase the amount of inertia, or the rotational speed of the inner rotor must be increased in excess of that of the outer rotor, e.g. by suitably influencing the wind impinging the rotors, thereby, however, impairing greatly the efficiency of the entire system. In using coaxial, coplanar and counterrotating rotors in a wind-driven power plant according to the invention, it is therefore generally advantageous to design each of the two rotors by itself to the highest possible aerodynamic efficiency and the lowest possible weight. In such an embodiment, the gyroscopic effects of the two counterrotating rotors will not eliminate each other, but rather a resulting angular momentum will remain, which may be utilized in accordance with the invention to facilitate the orientation of the rotating rotor system in the desired wind direction by utilizing precession. In any case, by an arrangement of coaxial, coplanar and counterrotating rotors, even of very large diameters and of very fast spinning ones, the total precessional effects can be reduced to a lower degree, or possibly completely eliminated, than by utilization of only one rotor of equal outer diameter, so that the precessional effect is relatively low or under certain circumstances disappears during adjustment movements of the rotors and only very small overall forces are produced. Moreover, the double rotor configuration results in very advantageous possibilities of structural design which will be explained hereinafter.

Advantageously a wind-driven power plant according to the invention with two coaxial, coplanar and counterrotating rotors may be so designed that each of the two counterrotating rotors carries a plurality of magnetic poles distributed about the periphery thereof, said magnetic poles interacting with the magnetic poles of the respective other rotor, the poles of at least one rotor having electrical conductor windings connected via leads to a collector so that the two rotors form the relatively rotatable parts ("stator" and "rotor") of a generator, or, if current is applied to the collector, of an electric motor. A great number of poles may be accommodated respectively along the periphery of the counterrotating rotors. Moreover, these poles may have very small dimensions and may be very light in weight. In this way, generators or electromotors can be produced which form a unit with the rotor and which have a very low weight-to-power ratio. The current generated in such a generator may be supplied through a collector and in this case subsequently connected rectifier or transformer unit to a network or to a motor.

Another favourable embodiment of the wind-driven power plant according to the invention, in which either a single rotor or two coplanar and coaxial counterrotating rotors may be provided is achieved in that the rotor or each of the counterrotating rotors supports a plurality of magnetic poles distributed about the periphery which intereact with magnetic poles mounted about the rotor gyration axis so as to prevent rotation about said gyration axis, either the poles of the rotor(s) or the poles mounted non-rotatably abut the rotor gyration axis having electrical conductor windings connected to a collector via leads, so that the rotor or each of the counterrotatong rotors together with the respectively associated poles mounted non-rotatably about the rotor gyration axis form the parts ("rotor" and "stator") of a generator, or, if current is supplied to the collector, of an electric motor.

In this embodiment, it is likewise possible to arrange a great number of poles around the periphery of the respective rotor or to mount them non-rotatably relative to the axis, in particular in a circle having a relatively large diameter. A generator or an electric motor with a very low weight-to-power ratio may be provided with this construction in that manner.

Advantageously, a wind power plant in accordance with one of the afore-described embodiments is designed such that the poles of one respective part of the generator or electromotor, e.g. the poles of a rotor or the poles mounted non-rotatably about the rotor gyration axis, are designed as permanent magnets. In such an embodiment, current may only be supplied to or tapped from the windings of the poles of one part, e.g. of a rotating rotor in the case of two two counterrotating rotors or from the windings of the poles mounted non-rotatably about the rotor gyration axis. As explained hereinbefore, current is generated in these embodiments of the inventive wind power plant as soon as the rotors are rotated by the wind. These embodiments, however, are highly advantageous in that the system acts as an electromotor which may cause the rotor(s) to be rotated or to be accelerated if they are standing still, or if they are rotating slowly, respectively, by supplying current to the poles provided with electrical windings. Hence, it is also possible, for example, to rapidly match the rotor speed to the optimum rotational speed required for utilizing the wind current under the prevailing wind conditions when starting the wind power plant. As soon as this speed is attained, motor operation may be changed over to generator operation by terminating the current supply and by switching over.

A favourable embodiment of the wind-driven power plant according to the invention may be designed such that the circular blade assembly of each rotor is enclosed both on the inner periphery and on the outer periphery by a duct hoop. This results in a stable construction of each rotor as well as in a controlled flow of the wind through the rotor plane which also permits more favourable utilization of the wind energy.

An advantageous embodiment of the wind-driven power plant according to the invention is achieved in that each of the coaxial, coplanar, counterrotating rotors is mounted by means of at least one hub on the rotor gyration axis and that the outer rotor is secured to its hub or hubs by means of struts straddling the inner rotor on both sides and sloping outwardly at an inclined angle towards the respective hub. Such a construction results in a very light weight structure which nevertheless is rigid with respect to deformation out of the rotor plane as a result of precessional forces and which ensures with simple means that the deformation of the counterrotating rotors due to the effect of precessional forces in opposite directions out of the rotor plane remains very small, thereby ensuring that variations in the annular gap between the counter-rotating rotors, and thus a variation of the efficiency of a generator formed by said rotors is kept very small. Irrespective of the afore-cited strut construction, coaxial, coplanar, counterrotating rotors are advantageous as compared to previously used known rotor assemblies having two coaxial counterrotating rotors arranged behind one another, in that the radial spacing is decisive in coplanar rotors when these are used as the parts of a generator. The radial spacing remains substantially constant around the periphery thereof even in the case of minor deformation due to the precessional effect, while in the case of rotors arranged in tandem, axial spacing is decisive. This axial spacing varies greatly about the periphery in tandem counterrotating rotors due to the precessional effect and thus the use of such rotors as parts of a generator is rendered considerably more difficult or almost impossible due to the excessively great variations in the effective air gap.

A particularly favourable embodiment, for which protection is claimed not only in conjunction with the wind-driven power plant according to the invention, but also independently thereof by itself when used in current generators or electric motors with radially adjacent poles which are movable relative to one another is obtained in that of the oppositely arranged poles of rows of poles of parts forming a generator or a motor and movable relative to each other, either the poles of the radially outer part or the poles of the radially inner part extend parallel to the direction of the rotor gyration axis at both sides beyond the opposite poles of the respective other part. In such an embodiment, if the parts of the generator or of the motor rotating relatively to each other are axially displaced in the direction of the rotor gyration axis, e.g. due to the effect of precession on counterrotating rotors, the magnetic field extending from the one pole to the other is not weakened or interrupted not even by the axial relative displacement, but remains maintained at full strength due to the fact that one pole of each pair of poles is longer in the axial direction toward both sides than the opposite pole. Since such axial displacements are relatively small, with the radial spacing between the poles remaining substantially unchanged, such a pole construction ensures that the magnetic field intensity remains practically unchanged in operation, thus ensuring undisturbed current generation or motor output. Such a pole construction may not only be used to advantage in conjunction with the rotors of wind-driven power plants, but may also be used in other current generators or electromotors, in which axial displacement may occur between the "stator" and "rotor" due to external factors.

An advantageous embodiment of the wind-driven power plant according to the invention is provided in that each rotor carries rows of poles interacting with corresponding rows of poles of the other part forming a generator or electromotor, together with the rotor, said rows of poles being secured to each rotor axially adjacent one another in the direction of the rotor gyration axis. In this manner, a very great number of poles may be accommodated and therewith a very high electrical output may be generated, or supplied during operation as a motor in a relatively small space when only one or two counterrotating rotors are used.

An embodiment of the wind-driven plant according to the invention may advantageously be constructed such that the rotor gyration axis of the rotor(s) is rotatably mounted approximately in the center of a support structure extending on at least one side of the rotor(s) diametrically along the main rotor plane, with the ends thereof being rotatably mounted in bearings diametrically opposite with respect to the rotor gyration axis, the imaginary axes of rotation of said bearings lying in the main rotor plane and being aligned with one another, said bearings being in turn secured to a carrier construction. Such a construction makes it possible to accomplish pivotability of the rotor gyration axis about an additional tilt axis in a light weight but nevertheless stable design.

A further development of the embodiment is advantageously designed such that the carrier construction is designed as a framework which is mounted in a rotary bearing construction so as to be rotatable about the upstanding axis. This results in a wind-driven power plant in which the rotor(s) are rotatable about three axes, i.e. the rotor gyration axis, the tilt axis and the upstanding axis.

Advantageously, such a development of the wind power machine may be further designed such that a device serving as a setting device for exerting a torque on the support structure with a torque vector lying in the rotary axis of the support structure is arranged at at least one end of said support structure. The device for exerting the torque may be designed, for example, as an electric motor which exerts a torque about the rotary axis of the support structure, i.e. about the tilt axis with a torque vector lying in the tilt axis. The drive means may be constructed such that it permits free rotation of the support structure about the tilt axis, i.e. idling rotation, when it is not energised.

When using coaxial and coplanar counterrotating rotors, a particularly favourable embodiment of the wind-driven power plant according to the invention, may be achieved in that the support structure includes a support ring arranged between the coaxial coplanar counterrotating rotors concentrically therewith and to which the inner rotor is rotatably mounted at its inner periphery. In this construction, it is possible to arrange a row of poles of permanent magnets both on the outer periphery of the inner rotor and on the inner periphery of the outer rotor and to arrange on the periphery of the support ring magnetic poles with conductor windings which interact with the rows of permanent magnetic poles. In this embodiment, it is not required to provide sliding contacts for conducting current from the inner or outer rotor to the support framework.

The configuration of the wind-driven power plant described hereinabove may be designed advantageously such that at least one control flap is settably and adjustably hinged on the upstream edge of the support ring. By means of such a control flap or a plurality of control flaps distributed diametrically or circumferentially about the periphery of said support ring, it is possible for example to control the flow of the wind impinging on the rotors in front of the rotor, e.g. to preferably conduct the wind to one of said rotors. Furthermore, by means of such control flaps it is also possible to produce tilting moments on the rotor system by utilizing the wind force acting on the control flaps, thereby achieving precession of the rotor system. Such control flaps may therefore be used under certain circumstances in place of mechanical or electromechanical setting devices for exerting torques with a vector lying, for instance, in the tilt axis. This requires, however, that one or more control flaps may be adjusted such that a force exerted by the wind will not act on the control flaps uniformly around the periphery of the rotors.

Another development of the afore-described embodiment, in which a support structure supporting the rotor(s) is mounted in another carrier construction so as to be pivotal about a tilt axis, provides that the carrier construction is designed as a framework construction rigidly connected to the ground. Such an embodiment is feasible, for example, when one or more counterrotating rotors are disposed in a canyon with the ends of the support structure being mounted in carrier constructions secured on opposite sides of the canyon so as to be pivotal about the tilt axis.

In order to facilitate an adaptation of the rotor(s) in such an embodiment to a change in the vertical wind stream component by utilizing the rotor precession, the embodiment may be constructed such that the support structure extends along both sides of the rotor(s) and the rotor gyration axis has ends projecting in front of and in back of the rotors, which are reciprocable by means of an adjusting device in guide paths in the front and rear portion of the support structure in an imaginary plane passing through the rotor axis and the bearing points of the support structure in a sense resulting in a torque effect with a vector lying in the upstanding axis. In this way, the rotor gyration axis may be turned about the upstanding axis within certain limits of angular rotation. During such turning movement, the rotor will precess and, in doing so, will tilt upwardly or downwardly thereby adjusting to a variation in the vertical wind stream component. The horizontal wind direction must remain substantially constant for such an embodiment of the wind-driven power plant, but this is the case anyway in the wind flow in a canyon.

A favourable constructive development of the aforecited embodiment of the wind-driven power plant according to the invention is provided, in which the ends of the rotor gyration axis are mounted in ball-and-socket bearings in fulcrum slides which in turn may be reciprocated in the guide paths in the front or rear portion of the support structure in opposite directions by means of lead screw drive means.

Another favourable embodiment of the wind-driven power plant according to the invention may be obtained in that the rotor gyration axis has ends projecting beyond the main rotor plane in front and in back thereof and mounted in guide paths in the front and rear portion of the support structure so as to be reciprocable by a setting device in an imaginary plane passing through the rotor gyration axis and the upstanding axis in a sense resulting in a torque effect with a vector lying in the tilt axis. In this embodiment, the pivotability of the rotor system about a tilt axis is not achieved by the rotor gyration axis being mounted in a support structure which in turn is pivotal about the tilt axis, but rather by the rotor axis itself being pivotable in the support structure about the rotor gyration axis and about a tilt axis by accordingly guiding the ends of the rotor gyration axis. Such a construction may be advantageous due to its simplicity particularly in smaller units of the inventive wind-driven power plant and in cases where relatively minor movements about the tilt axis are required.

A favourable development is provided also in this embodiment, if the ends of the rotor gyration axis are mounted in ball-and-socket bearings in fulcrum slides which in turn may be reciprocated upwards and downwards in the guide paths in opposite directions by means of drive means, e.g. lead screw means or pneumatic or hydraulic cylinder-piston units.

Figure 2:
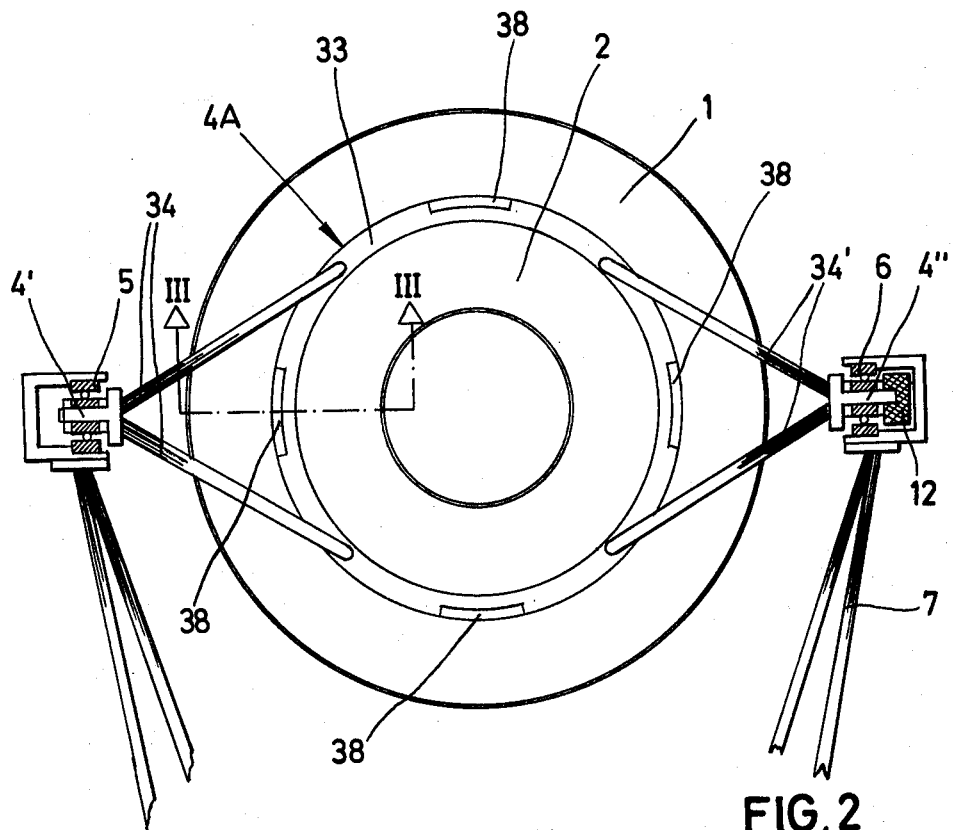
Figure 3:
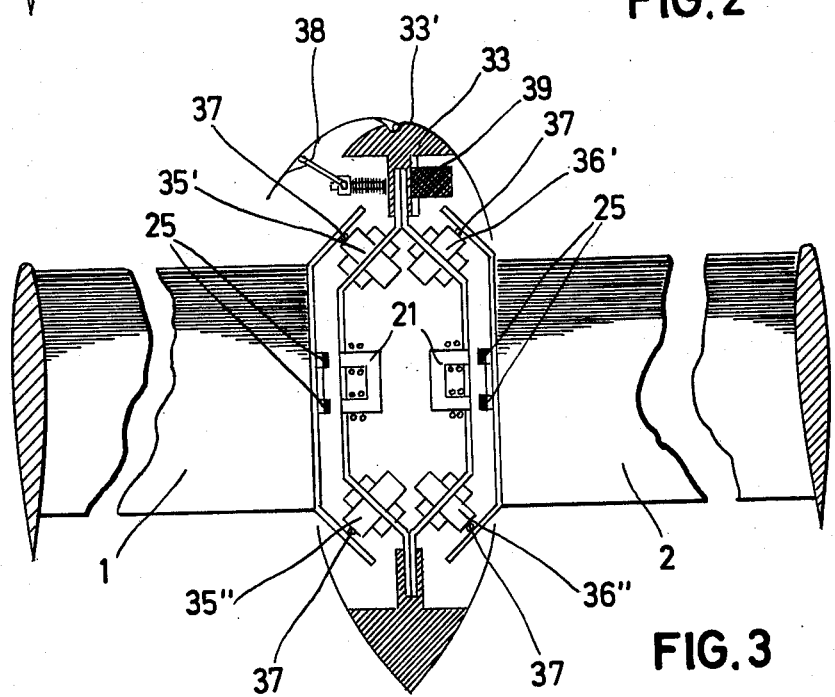
Figure 4:
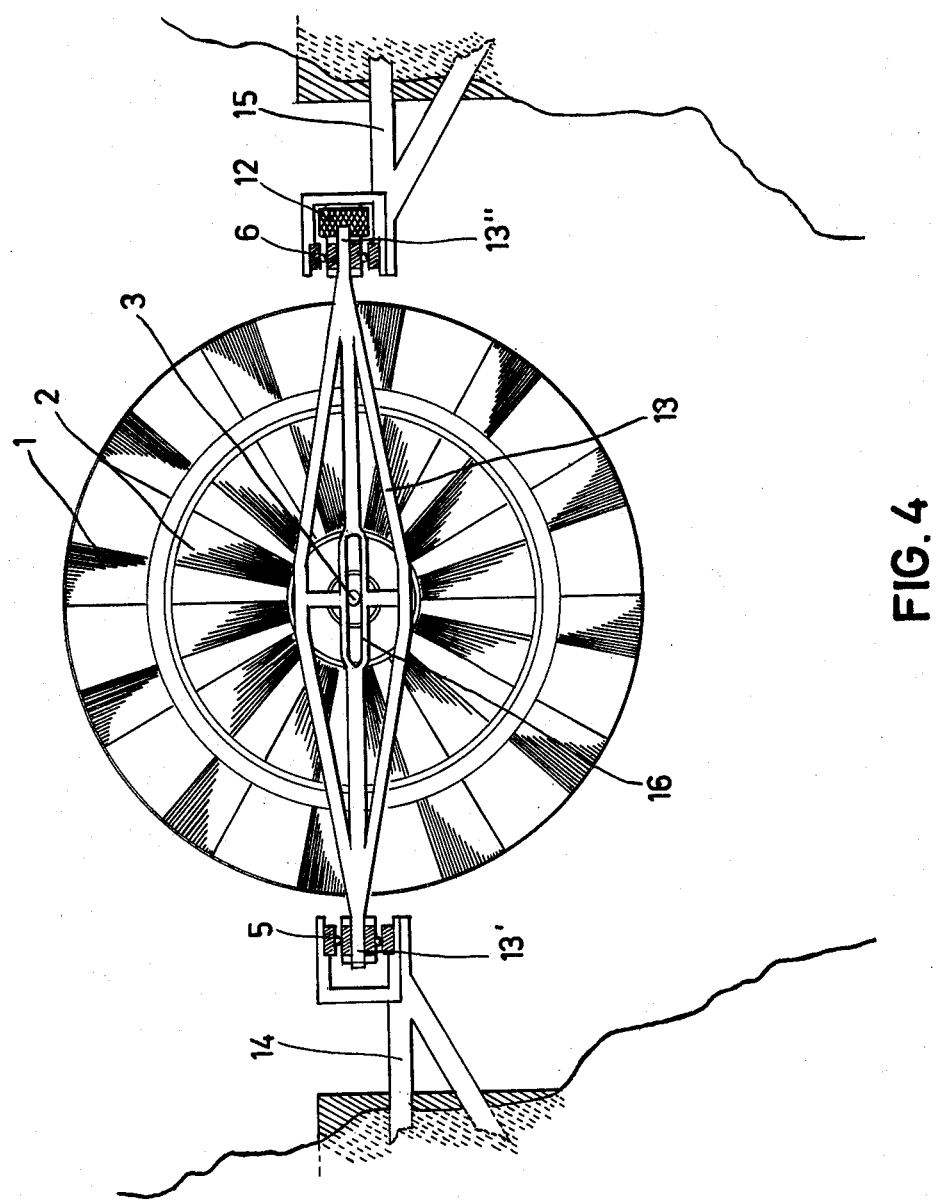
Figure 5:
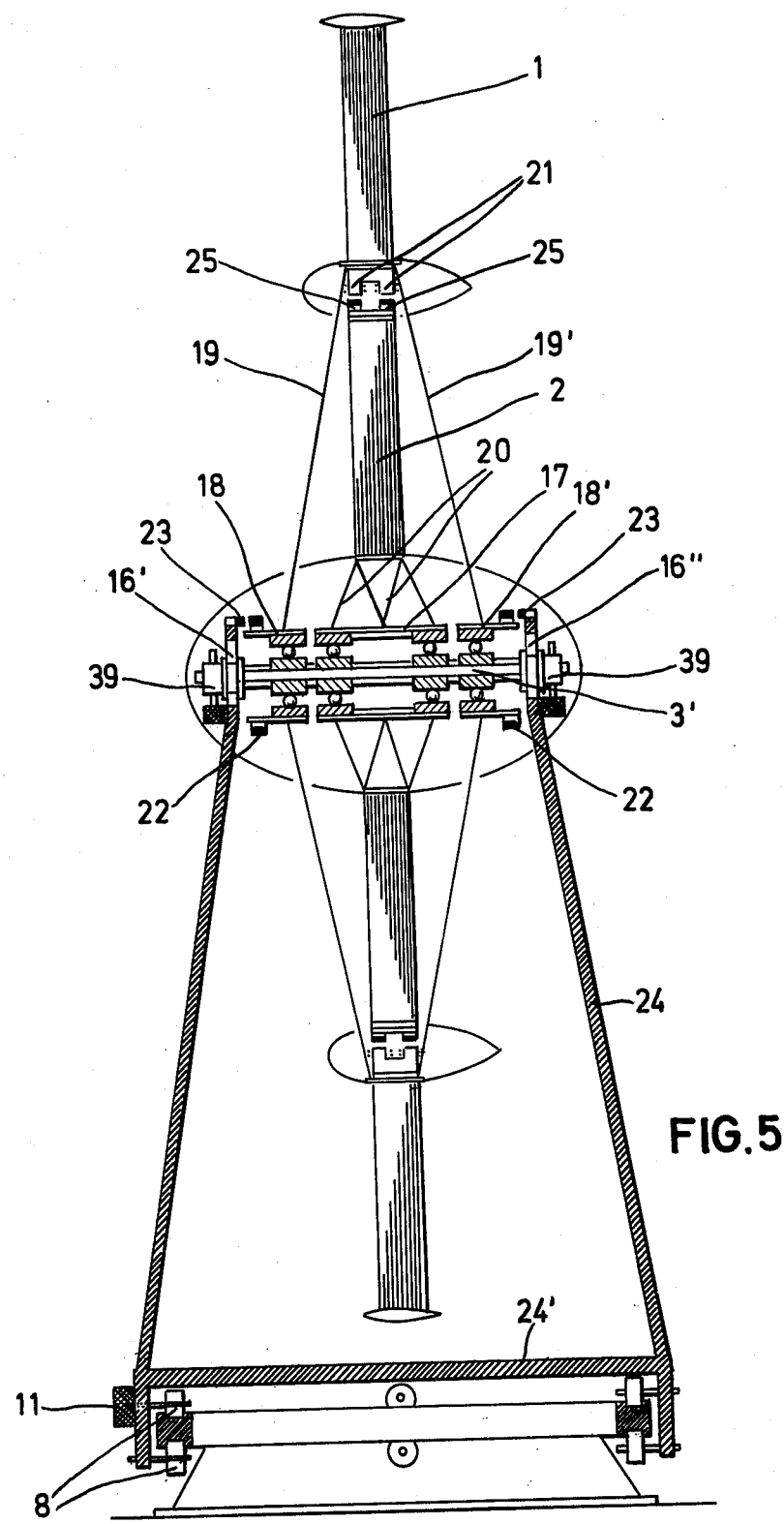
Figure 7:
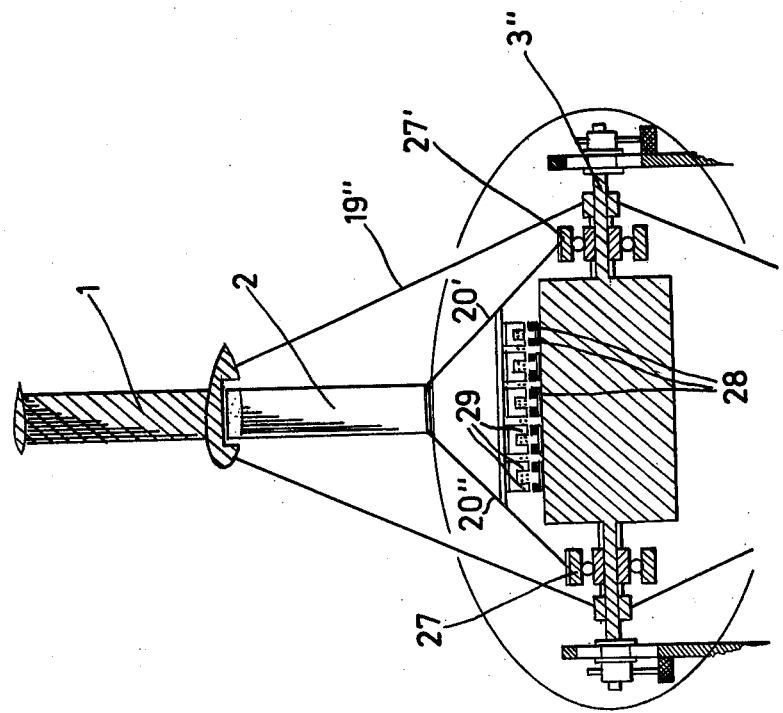
Figure 6:
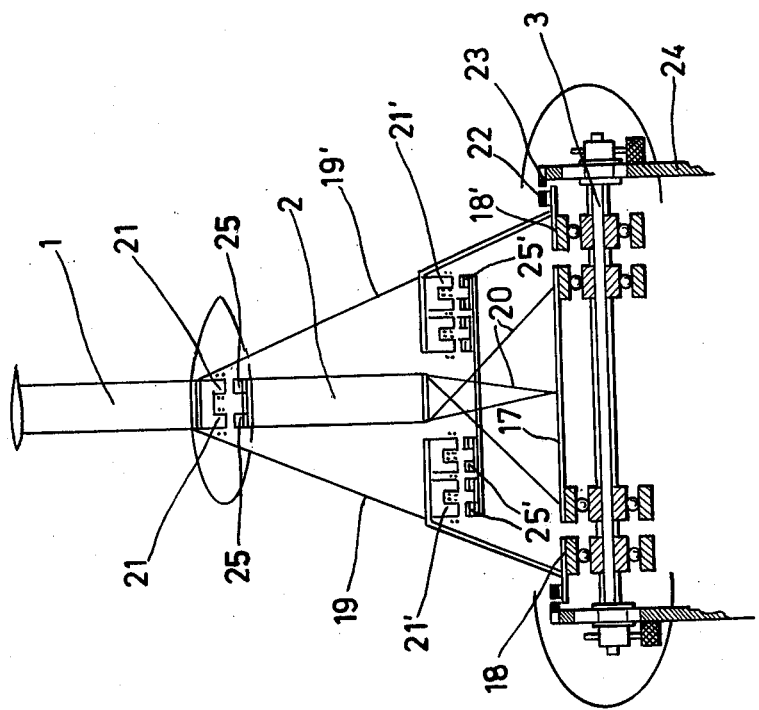
Figure 8:
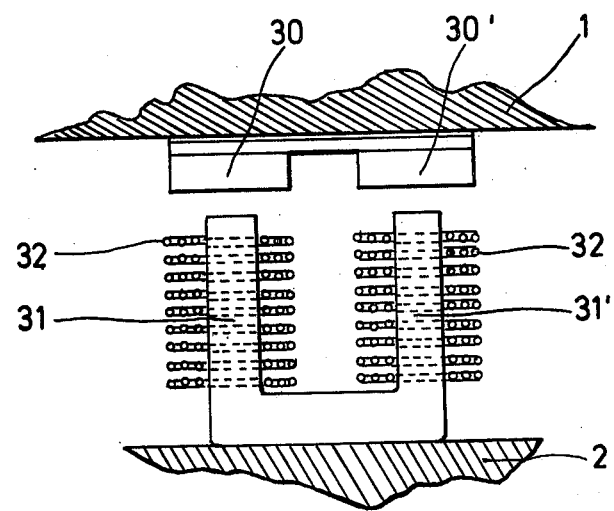

Embodiments of the inventive wind-driven power plant will be described hereinafter in conjunction with the drawing, in which:

FIG. 1 is a partially sectional elevation of a first embodiment of an inventive wind-driven power plant, FIG. 2 is a partly schematic and partly sectional elevation of a second embodiment of an inventive wind-driven power plant, FIG. 3 is a partially sectional elevation of the embodiment according to FIG. 2 along the line III — III in FIG. 2 on an enlarged scale, FIG. 4 is a partly schematic and partly sectional elevation of a third embodiment of an inventive wind-driven power plant installed in a canyon, FIG. 5 is a longitudinal section through a fourth embodiment of an inventive wind-driven power plant, FIG. 6 is a longitudinal section through a fifth embodiment of an inventive wind-driven power plant, FIG. 7 is a longitudinal section through a sixth embodiment of an inventive wind-driven power plant, FIG. 8 is a partially sectional elevation of a pair of poles of a generator formed in an inventive wind-driven power plant.

In the first embodiment of the wind-driven power plant illustrated in FIG. 1, two coaxial, coplanar, counterrotating rotors 1 and 2 are rotatably mounted about a common rotor gyration axis 3 in the following sometines called rotor axis or axis of rotation. The circular rotor blade assembly of each rotor 1 or 2 is enclosed both on the inner periphery and on the outer periphery by a duct hoop 1' or 1" or 2' or 2", respectively. The rotor gyration axis 3 is rotatably mounted in the centre of a support structure 4. The support structure is designed in the illustrated embodiment as a construction welded together from a plurality of profile members or tubes, one portion of the structure extending along the one side of the two rotors (visible in FIG. 1) and the other portion along the other side of the two rotors. The portions extending on both sides of the rotors are united at both ends of the support structure. An axis 4' is located at one end of the support structure while an axis 4" is located at the other end and is aligned with said axis 4', both axes 4' and 4" being positioned in the main rotor plane. The axes 4' and 4" are rotatably mounted in bearings 5 and 6 which are located diametrically opposite with respect to the rotors and whose imaginary axes of rotation lie in the main rotor plane and are aligned with one another. The bearings 5 and 6, constructed as ball bearings in the illustrated embodiment, are secured to a carrier construction 7 which is constructed in the illustrated embodiment as a framework formed from struts which are welded together. In the lower area of the carrier construction 7, there is a base plate 7' which is mounted via pairs of rollers 8 on a swivel ring 9 to be rotatable about a vertical axis passing through the axis of rotation 3 and the imaginary axis connecting the bearings 5 and 6. The swivel ring 9 is secured to the ground by means of an anchor construction 10.

One of the rollers 8 is drivingly connected to an electromotor 11 attached to the base plate 7'. When the electromotor 11 is energised, the roller 8, which is designed as a friction roller, rotates the carrier construction as well as the rotors about the upstanding axis, i.e. about the vertical axis in the present example.

The axis 4" of the support structure 4 is drivingly connected to an electromotor 12 which is secured to the carrier construction 7. When the electromotor 12 is energised, it exerts on the axis 4" a torque with a vector lying in this axis, thereby causing the rotors to turn about the tilt axis 4' - 4". In this embodiment of the wind-driven power plant, the two counterrotating rotors are thus rotatable about three axes which form an angle with one another, i.e. axes 3, 4' - 4", and the vertical axis lying in the centre of the swivel ring 9.

If the two counterrotating rotors of the embodiment of the wind-driven power plant illustrated in FIG. 1 are in rotation, they constitute two coaxial and coplanar counterrotating gyroscopes. If these two gyroscopes are not dimensioned such that their angular momentums are equal and opposite in direction, then a precession of the two rotors 1 and 2 will result due to the laws of gyroscopic precession if the carrier construction 7 is rotated about the vertical axis by means of the electromotor. Due to this precession, the rotor gyration axis 3 may be tilted about the tilt axis 4' - 4" in an upward or downward direction. On the other hand, the entire system will precess about the vertical axis if the electromotor 12 is energised under the afore-cited conditions, thus turning the rotor axis about the tilt axis 4' - 4" with rotors 1 and 2. This means that the carrier construction 7 will then be rotated about the vertical axis. In the illustrated wind-driven power plant, an exact alignment of the rotors to the respectively prevailing wind direction may thus be accomplished by utilizing gyroscopic precession by exerting torques on the system about the vertical axis by means of the electromotor 11 or about the tilt axis by means of the electromotor 12. Under certain circumstances, both electromotors 11 and 12 may have to be energised simultaneously for a limited period of time in order to achieve the desired alignment. In each case, however, very small torques produced by the electromotors 11 and 12 are needed to effect correct positioning quickly and exactly even in the case of rotor systems with very large dimensions, since these great masses are adjusted by precessional movement without previously having to decelerate or to stop the rotation of the rotors in order to change position. During this, the support structure 4 and the carrier construction 7 only have to absorb very small forces caused by the weight of the rotors. Bearing forces caused by precession, as occurred to a detrimental extent in known prior art wind-driven power plants, are completely eliminated by the triaxial mounting of the rotors.

Rotor orientation may be controlled in the illustrated embodiment by means of a control device which produces control signals in dependence of the rotational speed of the rotors and of the desired direction. The desired direction, i.e. the direction of the wind flow, may be determined, for example, by means of a measuring instrument such as a gimbal-suspended measuring vane, by means of which the required angle of rotation may be determined continuously both in a vertical and in a horizontal direction. The measuring vane signals may be converted into electric signals which are processed in the control device and which may be transformed into instruction signals for the electromotors 11 and 12. Continuous automatic alignment of the rotors in the wind direction is possible in this manner.

In the embodiment illustrated in FIG. 1, a plurality of (not shown) magnetic poles is distributed along and secured to the inner periphery of the outer rotor and the outer periphery of the inner rotor respectively. The poles of the inner rotor are designed as permanent magnets, whereas the poles of the outer rotor are electromagnetic poles surrounded by electrical conductor windings. The arrangement of these poles is not shown in FIG. 1, but corresponds to the arrangement illustrated in FIG. 5 which will be discussed hereinafter. The electrical conductor windings of the poles of the outer rotor are connected to a mains network or to an electrical consumer through a collector (not shown) surrounding the axis of rotation 3 and a lead (not shown) which extends along the support structure 4 and continues to the carrier construction 7 via a slip ring contact. In this configuration, the counterrotating rotors 1 and 2 form the relatively rotatable parts of a current generator. If the rotors are rotated in opposite senses by the wind flow, this generator supplies a current to the connected mains network or to the electric consumer. On the other hand, the counterrotating rotors 1 and 2 may be set in rotation out of an in-operative state if a suitable current is supplied from a power source to the poles of the outer rotor since the rotors 1 and 2 then act as the parts of an electromotor. In this way it is possible for the rotors to rapidly attain a rotational speed corresponding to the optimum rotational speed for utilizing the prevailing wind flow when the wind-driven power plant is started up.

The mounting of rotors 1 and 2 about the axis of rotation 3 is only schematically illustrated in FIG. 1. The rotor construction and mounting, however, may be accomplished in the same manner as illustrated in FIG. 5 and discussed hereinafter.

A second embodiment of an inventive wind-driven power plant is illustrated in FIG. 2. In this embodiment, two coaxial coplanar counterrotating rotors 1 and 2 are provided which are rotatably mounted in a support structure 4A. The support structure includes a support ring 33, having the outer rotor 1 rotatably mounted on its outer periphery and the inner rotor 2 rotatably mounted on its inner periphery. Support arms 34 and 34' extend toward both sides in diametrically opposite directions from the support ring 33 on both sides of the main rotor plane. The ends of the support arms 34 or the ends of the support arms 34' are joined at both ends of the support structure 4A formed by the support ring 33 and the support arms 34 and 34' extending along both sides of the main rotor plane, and support aligned axes 4' and 4" which are positioned in the main rotor plane. The mounting of these axes 4' and 4", which together form a tilt axis 4' - 4", in opposite bearings 5 and 6 as well as the mounting of these bearings in a carrier construction 7 and the rotatable mounting of the same correspond to the structure described with reference to the embodiment according to FIG. 1 so that reference may be made to the statements relating to this figure. This also applies to the arrangement of the electromotor 12 as a setting device for exerting a torque about the tilt axis 4' or 4". The rotors are oriented in the desired direction in the embodiment according to FIG. 2 in the same manner as in the embodiment according to FIG. 1 so that reference may be made to this embodiment.

A section through the rotor assembly in the embodiment according to FIG. 2 is illustrated on an enlarged scale in FIG. 3. The sectional illustration reveals that rollers 35' and 35" are rotatably mounted on the support ring 33 and are distributed about its periphery. The running surfaces of said rollers are exposed on the outer periphery of the support ring 33 and the outer rotor 1 is rotatably mounted thereupon by means of tracks 37. Analogously, the inner rotor 2 is rotatably mounted on the inner periphery of the support ring 33 on rollers 36' and 36" by means of tracks 37. The support ring 33 is stationary, while the rotors 1 and 2 rotate in opposite senses. This support ring serves as a mount for the rollers 35', 35", 36', 36" and also constitutes a portion of the support structure 4A. The support ring 33 is designed in this embodiment as the "stator" of a current generator, whereas each rotor 1 and 2 is designed as a "rotor" of a generator. Electromagnetic poles 21 are spaced on the support ring 33 both along the outer periphery as well as along the inner periphery, and are provided with conductor windings through which current may flow. Permanent magnetic poles 25 co-operating with the respective poles 21 to produce electric current are affixed opposite to these poles both on the outer rotor 1 as well as on the inner rotor 2. The arrangement and configuration of these poles will be explained in detail hereinafter with reference to the embodiments according to FIGS. 5 and 7. The embodiment according to FIG. 2 is advantageous in that current does not have to be taken off rotor 1 or rotor 2 via slip contacts to the support structure 4A, but rather the generated current is produced and flows in the leads of the poles 21 of the support ring 33 which belongs to the support structure 4A anyway, thereby resulting in a simple construction of the generator formed by the support ring 33 and the two rotors with no slip contacts required.

As is evident from FIGS. 2 and 3, four control flaps 38 are hinged to the upstream front edge 33' of the support ring 33 in spaced relation along its periphery. The flaps are adapted to be locked in their respective position. Each of the control flaps 38 is adjustable and lockable in position by a setting motor 39 illustrated in FIG. 3, e.g. an electromagnetic solenoid or a hydraulic or pneumatic piston-cylinder unit. If all four control flaps 38 are extended simultaneously, this causes the inflow cross-section of the outer rotor to be constricted at four areas distributed along the periphery, thereby making it possible to influence the air in-take to the entire rotor system. The control flaps 38, however, may be extended selectively and individually. If, for instance, the control flap illustrated at the top in FIG. 2 is swiveled outwardly alone while the other control flaps are maintained in the closed position, this causes an unsymmetrical air in-take of the rotor 1 with respect to the tilt axis, which results in a torque about the tilt axis acting on the rotor system. Hence, the control flaps may be used either in place of or in addition to the motor 12 as setting devices for exerting a torque about the tilt axis, and thus for positioning the rotor system.

The magnitude of the torque produced by extending a control flap 38 may be influenced by the respective swing out angle of the control flap which is variably adjustable.

FIG. 4 illustrates an embodiment of the wind-driven power plant in which two counterrotating coaxial and coplanar rotors 1 and 2 rotate about a rotor gyration axis 3 which itself is mounted in a support structure 13. The support structure is designed as a welded construction of tubes or profile sections and its structure corresponds to a large extent to the support structure 4 described with reference to the embodiment in FIG. 1. The ends of the support structure 13 are again rotatably mounted in bearings 5 and 6 whose imaginary axes are aligned with one another and are positioned in the main plante of the rotors 1 and 2 and thus define a tilt axis 13' - 13" for rotors 1 and 2. The bearings 5 and 6 are mounted in carrier structures 14 and 15 which are in turn secured to opposite walls of a canyon. The main rotor plane of the rotors 1 and 2 extends transversely to this canyon.

The design of the support structure 13 differs in principle from the support construction 4 described in FIG. 1, since guide paths 16 are respectively provided in the centre of the support structure 13 in the portions thereof extending in front of and behind the main rotor plane. The ends of the rotor gyration axis 3 which project out from the main rotor plane towards the front and back are guided in these guide paths 16. For instance, the ends of the rotor gyration axis 3 are mounted in ball-and-socket bearings (not shown in FIG. 4 for reasons of clarity) in fulcrum slides (not shown), said fulcrum slides in turn being displaceable to and fro in the guide paths of the front and rear portions of the support structure 13 in opposite directions by means of lead screw drive means (not shown either for reasons of clarity). These drive means may in turn be controlled by a control device to which the vertical wind component, measured e.g. by a wind vane, is supplied as a measuring signal. The guide paths 16 extend transversely to the rotor axis parallel to the tilt axis 13' - 13". By displacing the ends of the rotor axis in these giude paths, it is thus possible to turn the main rotor plane of the rotors 1 and 2 together with the rotor axis 3 about an upstanding axis extending perpendicular to the tilt axis 13' - 13" and perpendicular to the rotor axis 3. If in this embodiment the counterrotating rotors 1 and 2 are rotating and such pivotating of the rotor axis 3 occurs in the guides 16, precession of the rotors 1 and 2 will take place causing the rotor axis to tilt upwardly or downwardly about the tilt axis 13' - 13". In this manner, it is possible to adapt the position of the rotors to the direction of an ascending or descending wind, i.e. to a change in the vertical wind flow component, by utilising gyroscopic precession. In this case, very slight changes in the orientation of the rotor axis 3 in the guides 16 are already sufficient to effect this tilting. Adaptation to horizontal changes in the wind direction is not required in the embodiment shown, since wind in a canyon blows in the direction of the canyon and does not substantially change its direction. An electromotor 12 is secured to the carrier framework 15 for exerting a tilting movement about the axis 13'. This electromotor acts in a manner analogous to the electromotor 12 in the embodiment according to FIGS. 1 and 2. In the embodiment according to FIG. 4, however, it is only used as a setting device to a very limited extent, if at all, since an adaption to a horizontal wind direction is not required in this case. In this embodiment, it is used to tilt the entire system about the tilt axis when the rotor is not spinning.

Another embodiment of the wind-driven power plant is illustrated in a longitudinal section in FIG. 5. As far as parts of this embodiment correspond in principle to parts of embodiments already described above, the same reference numerals have been used. In this embodiment, two coaxial, coplanar and counterrotating rotors 1 and 2 are again provided, which are rotatably mounted about a rotor gyration axis 3'. The circular rotor blade assembly of each rotor is enclosed both at the inner periphery and at the outer periphery by a duct hoop. This results in an air flow guidance which leads to an optimum utilisation of wind energy. The inner rotor 2 is mounted on the rotor axis 3' via ball bearings by means of a hub 17; the outer rotor 1 is rotatably mounted on the rotor axis 3' via ball bearings by means of two hubs 18 and 18' arranged on both sides of said hub 17. The outer rotor 1 is secured to the hubs 18 and 18' by means of struts 19 and 19' straddling the inner rotor 2 on both sides and extending obliquely outwardly toward the hubs 18 and 18'. The inner rotor 2 is itself attached to hub 17 by means of a plurality of oblique struts 20. Such a strut construction results in a very light structure which, however, is rigid enough to prevent deformation out of the rotor plane.

In the embodiment according to FIG. 5, magnetic poles are likewise mounted on the inner periphery of the outer rotor 1 and on the outer periphery of the inner rotor 2 in spaced distribution around the periphery as in the case of the afore-described embodiments. In the embodiment according to FIG. 5, two poles each are provided adjacent one another in axial direction. The poles 21 secured to the outer rotor 1 have electrical conductor windings connected by leads (not shown) extending along the struts 19 and 19' to collectors 22 in contact with slip contacts 23 secured to a support structure 24. From the slip contacts 23, leads (not shown for reasons of clarity) lead to a main network or to an apparatus consuming electrical energy. If desired, a current transformer may be connected therebetween. The poles 25 on the outer periphery of the inner rotor 2 are designed as permanent magnets. The counterrotating rotors 1 and 2 thus form parts of a current generator or, if current is supplied externally to the windings of the poles 21, parts of an electromotor.

In the embodiment according to FIG. 5, the rotor axis 3' has ends projecting beyond the main rotor plane toward the front and back which are mounted in guide paths 16' and 16" in a front and rear portion of the support structure 24. These guide paths extend parallel to one another in a vertical direction. A setting motor, e.g. a hydraulic or pneumatic cylinder-piston unit or an electromotor with lead screw drive means 39, is secured to the support structure 24 adjacent each guide path 16' or 16" respectively. These setting motors 39 act on the ends of the axis of rotation 3' such that if the one end of the rotary axis is raised, the other end is simultaneously lowered by the same amount. In this manner, a torque with a vector lying in the tilt axis, i.e. lying in the main rotor plane, and intersecting the upstanding axis, may be exerted on the axis of rotation. The rotor axis and thus the rotor system consisting of the counterrotating rotors 1 and 2 may be turned about the tilt axis by such a tilting movement. If in this case the rotors are rotating, precession occurs about the upstanding axis by which the orientation of the rotors may be matched to a changing horizontal wind direction. The direction of the rotors is adjusted in this embodiment in a manner analogous to that in the embodiment according to FIG. 1. In the embodiment according to FIG. 5, the support structure 24 is rotatably mounted about the upstanding axis by means of a plate 24' provided in the lower part. The structure and operation of this mounting as well as of the electromotor 11 provided as the adjustment device correspond to the mounting about the upstanding axis in the embodiment according to FIG. 1 so that reference may be made to the description relating thereto.

In the embodiment according to FIG. 5, the extent of tilting movement of the rotors is very limited due to the short length of the guide paths 16' and 16". In many cases, however, such a limited tiltability is fully sufficient to control the orientation of the rotors.

The strut construction for the rotors employed in the embodiment according to FIG. 5 may also be used, for example, in the wind-driven power plants according to FIGS. 1, 3 and 4.

FIG. 6 shows a further embodiment of a wind-driven power plant whose principles of construction correspond to that of the wind-driven power plant in accordance with FIG. 5. The same reference numerals have been used for parts whose functions agree in principle.

In this embodiment, a plurality of rows of poles, which interact with corresponding rows of poles of the other rotor, are positioned in axially adjacent arrangement on each rotor 1 or 2 in the direction of the rotor gyration axis 3' respectively. In this case, two rows of poles 21 are provided in axially adjacent relation on the inner periphery of the outer rotor 1 and are opposed on the outer periphery of the inner rotor 2 by two rows of poles 25. In addition, further rows of poles 21' are provided in axially adjacent relation on the struts 19 and 19' of the outer rotor 1 at the level of the inner periphery of the inner rotor 2 opposite to rows of poles 25' secured to the struts 20 of the inner rotor 2. By increasing the number of rows of poles, the power output obtainable in the generator or, if the system operates as a motor, the possible power input, may be increased.

Another embodiment of the wind-driven power plant is shown in a longitudinal section in FIG. 7. The fundamental arrangement again correspond to the embodiment according to FIG. 5 or FIG. 6. In the embodiment according to FIG. 7, however, the external rotor is directly secured to the rotor gyration axis 3" by struts 19", whereas the inner rotor is secured via struts 20' and 20" to hubs 27 and 27' which are rotatably mounted on the rotor gyration axis 3". The rotor axis, which in this embodiment rotates together with the rotor 1, has an enlarged diameter in its middle section and bears a plurality of rows of magnetic poles on its outer periphery with magnetic poles distributed about said periphery. These rows of magnetic poles 28 are arranged in axial spaced relation. A plurality of rows of magnetic poles 29, in which the magnetic poles are surrounded by electrical windings, is arranged on the struts 20' and 20" of the inner rotor 2 such that they lie opposite the rows of magnetic poles 28. The pole windings of the rows of magnetic poles 29 are again connected via leads (hot shown) to a collector (not shown) through which the generated current is transmitted via slip contacts to the consumer system, or through which current may be supplied in the event that the rotors are to operate as an electromotor.

To improve the flow conditions, the central area in the centre of the coaxial rotors 1 and 2 in the embodiments of the wind-driven power plant illustrated in FIGS. 1–8 is aerodynamically faired with fairings or cowlings. Such fairings or cowlings are illustrated in sectional elevation in FIGS. 5, 6 and 7.

FIG. 8 shows, on an enlarged scale, magnetic poles as may be secured to the outer rotor 1 or the inner rotor 2 of one of the afore-described examples of a wind power plant. In this example, two rows of permanent magnetic poles 30 and 30' are arranged in axially spaced relation on the inner periphery of the outer rotor 1. Two rows of electromagnetic poles 31 and 31' are arranged on the outer periphery of the inner rotor 2 radially opposite the rows of poles 30 and 30'. Each of the poles of the rows 31 and 31' includes an electrical conductor winding 32. These windings are connected to the afore-mentioned collectors through leads (not shown). FIG. 8 reveals that poles 30 and 30' of the opposing poles 30, 30' and 31, 31' project at both sides beyond the opposite poles 31 or 31' in a direction extending parallel to the direction of the rotation axis. If precession of the rotors 1 and 2 occurs during changes of the rotor axis' position, the rotors will tend to precess in opposite directions because they rotate in opposite directions, thus being subjected to oppositely directed torques which tend to bend the rotors 1 and 2 out of the main rotor plane in opposite sense. Due to the flexibility of the rotors 1 and 2, minor axial displacements between the inner periphery of the outer rotor 1 and the outer periphery of the inner rotor 2 may be produced by these torques, i.e. axial displacements which cause poles 30 and 30' of the outer rotor to migrate axially to the one or other side relative to the poles 31 and 31' of the inner rotor. The fact, however, that poles 30 and 30' project axially beyond the poles 31 and 31' of the inner rotor on both sides when the rotors are not subjected to external forces, ensures even in the case of such minor axial displacement that the magnetic field between the poles 31 and 31' as well as poles 30 and 30' is not reduced or interrupted, but is maintained at full strength. The width of the air gap between the poles also remains substantially unchanged by the minor axial displacement between the rotors, in that the radial spacing remains substantially constant.

This ensures that the generator output is not impaired even during adjustment movement of the counterrotating rotors and the precessional torques produced thereby.

The pole construction illustrated in FIG. 8 is not only applicable in the case of counterrotating rotors in wind-driven power plants, but is generally applicable in current generators or electric motors in which an axial displacement may occur between parts which rotate relative to one another about an axis of rotation (e.g. "stator" and "rotor"). The circumstances which produce axial displacement between the poles are of no significance in this case for the winding of pole construction.

This invention is not limited to the examples described hereinbefore. For instance, an inventive wind-driven power plant may be designed such that more than two coplanar, coaxial rotors are provided. It is also possible to have all rotors of a plurality of coaxial, coplanar rotors rotate in the same direction. In this case, the gyroscopic effects of the rotors are added to one another, whereas in the case of counterrotating rotors, they compensate each other.

In the embodiments described hereinbefore with reference to the figures, two counterrotating rotors respectively form a generator. It is readily possible, however, to design an inventive wind-driven power plant such that a rotor or a plurality of counterrotating rotors drives, or drive, a separate generator or directly drive other work machinery, e.g. a pump, via a rotary axis eventually connected through a transmission means. In this case, the driven machinery may be coupled to the rotary axis, for example, through a cardan shaft so that the omnidirectional pivotability of the rotor axis is not impeded by the connection with the machine to be driven.

All features revealed by the specification, the description and the drawing may be essential to the invention in any arbitrary and optional combinations as well.

What is claimed is:

1. A wind-driven power plant comprising at least one rotor having a gyration axis, a base, a carrier construction pivotable on said base about an upstanding axis, a support structure pivotable on said carrier construction about a tilt axis in a manner permitting precession of said rotor, said rotor being rotatably supported by said support structure and rotatable about said gyration axis, an adjusting device for pivoting said carrier construction on said base in response to changes in horizontal wind direction, a setting device for exerting torque directly or indirectly on the rotor gyration axis or on the rotor which has a torque vector component extending perpendicularly to the rotor gyration axis and perpendicularly to the upstanding axis, said tilt axis intersecting both the rotor gyration axis and the upstanding axis and forming an angle with both, and a control device for controlling the mangitude of movement of said adjusting and setting devices in response to the rotor rotational speed and the desired wind direction orientation to be exerted on the rotor in in accordance with the torque to be exerted by the upstanding axis adjusting device and in compliance with the laws of gyroscopic precession.

2. The wind-driven power plant according to claim 1, wherein the construction of all parts of the wind-driven power plant and the mounting of the rotor is designed such that mass equilibrium is respectively provided for the rotary motion about each of the three axes, the rotor gyration axis, the tilt axis and the upstanding axis.

3. The wind-driven power plant according to claim 2, wherein two coaxial, coplanar counterrotating rotors are mounted so as to be rotatable about the rotor gyration axis.

4. The wind-driven power plant according to claim 3, including a collector and leads connected thereto wherein each of the two counterrotating rotors carries a plurality of magnetic poles distributed about the periphery thereof, said magnetic poles interacting with the magnetic poles of the respective other rotor, the poles of at least one rotor having electrical conductor windings connected via said leads to said collector so that the two rotors form the relatively rotatable parts of a generator or, if current is supplied to the collector, of an electromotor.

5. The wind-driven power plant according to claim 4 wherein the poles of one of the rotors are designed as permanent magnets.

6. The wind-driven power plant according to claim 4, wherein the oppositely arranged poles of rows or poles of parts forming a generator or a motor and movable relative to each other, either the poles of the radially outer part or the poles of the radially inner part extend parallel to the direction of the rotor gyration shaft at both sides beyond the opposite poles of the respective other part.

7. A wind-driven power plant according to claim 3 wherein each rotor is enclosed both on the inner periphery as well as on the outer periphery by a duct hoop.

8. The wind-driven power plant according to claim 7, including hubs mounted for rotation about said gyration axis and wherein each of the coaxial, coplanar, counterrotating rotors is mounted on at least one of said hubs, said outer rotor being secured to two hubs by means of said struts straddling the inner rotor on both sides and sloping outwardly at an inclined angle towards the respective hub.

9. The wind-driven power plant according to claim 1, including collector, leads attached thereto and a set of magnetic poles non-rotatably mounted about the rotor gyration axis and supports a set of magnetic poles distributed about the periphery which interact with the poles mounted non-rotatably about the rotor gyration axis one of the sets of poles having electrical conductor windings connected to a said collector via said leads, so that the rotor together with the respectively associated poles mounted non-rotatably about the rotor gyration axis form the parts of a generator or, if current is supplied to the collector, of an electromotor.

10. The wind-driven power plant according to claim 9 wherein the poles of one of the rotors are designed as permanent magnets.

11. The wind-driven power plant according to claim 9, wherein the oppositely arranged poles of rows or poles of parts forming a generator or a motor and movable relative to each other, either the poles of the radially outer part or the poles of the radially inner part extend parallel to the direction of the rotor gyration shaft at both sides beyond the opposite poles of the respective other part.

12. The wind-driven power plant according to claim 9, wherein each rotor carries several rows of poles interacting with corresponding rows of poles of the other part forming a generator or electromotor with said rotor, said rows of poles being secured to each rotor axially adjacent one another in the direction of the rotor gyration axis.

13. The wind-driven power plant according to claim 1, including bearings wherein the rotor gyration axis of the rotor is rotatably mounted approximately in the center of said support structure, said bearings being in turn secured to said carrier construction.

14. The wind-driven power plant according to claim 13, wherein the carrier construction is designed as a framework which is mounted on said base so as to be rotatable about the upstanding axis.

15. The wind-driven power plant according to claim 13, wherein said setting device exerts a tongue on the support structure with a torque vector lying in the tilt axis of the support structure and is arranged at at least one end of said support structure.

16. The wind-driven power plant according to claim 13, wherein the support structure includes a support ring arranged between the coaxial coplanar counterrotating rotors concentrically therewith and to which the inner rotor is rotatably mounted along its outer periphery and the outer rotor is rotatably mounted along its inner periphery.

17. The wind-driven power plant according to claim 16, including at least one control flap and wherein at least one control flap is settably and adjustably hinged on the upstream edge of the support ring.

18. The wind-driven power plant according to claim 13, wherein the carrier construction is designed as a framework construction rigidly connected to the ground.

19. The wind-driven power plant according to claim 18, wherein the support structure extends along both side of the rotor and wherein the rotor gyration shaft has ends projecting in front and in back of the rotor which are reciprocable by means of an adjusting device in horizontal guide paths in the front and rear portion of the support structure in an imaginary plane passing through the rotor gyration shaft and the bearing points of the support structure in a sense resulting in a torque effect with a vector lying in a vertical axis.

20. The wind-driven power plant according to claim 19, including ball and socket bearings in fulcrum slides and lead screw drive means mounted on said support structure and wherein the ends of the rotor gyration shaft are mounted in said ball and socket bearings in fulcrum slides which in turn may be reciprocated in the guide paths in the front and rear portion of the support structure in opposite directions by means of said lead screw drive means.

21. The wind-driven power plant according to claim 1, wherein the rotor gyration shaft has ends projecting beyond the rotor plane in front and in back thereof and mounted in vertical guide paths in the front and rear portion of the support structure so as to be reciprocable by a setting device in an imaginary plane passing through the rotor gyration shaft and the upstanding axis in a sense resulting in a torque effect with a vector lying in the tilt axis.

22. The wind-driven power plant according to claim 21, including ball and socket bearings in fulcrum slides and lead screw drive means mounted on said support structure and wherein the ends of the rotor gyration shaft are mounted in said ball and socket bearings in fulcrum slides which in turn may be reciprocated in the guide paths in the front and rear portion of the support structure in opposite directions by means of said lead screw drive means.

* * * * *